United States Patent [19]

Rowland

[11] 4,086,910
[45] May 2, 1978

[54] SOLAR ABSORBER PANEL

[75] Inventor: Robert S. Rowland, Lansing, Mich.

[73] Assignee: Tranter, Inc., Lansing, Mich.

[21] Appl. No.: 677,055

[22] Filed: Apr. 14, 1976

[51] Int. Cl.² .............................................. F24J 3/02
[52] U.S. Cl. ................................................. 126/271
[58] Field of Search ................ 165/170; 126/270, 271;
237/1 A

[56] References Cited

U.S. PATENT DOCUMENTS

| 2,856,164 | 10/1958 | Adams | 165/170 |
|---|---|---|---|
| 3,141,500 | 7/1964 | Raskin | 165/170 |
| 3,822,742 | 7/1974 | Stowell | 165/170 |
| 4,021,901 | 5/1977 | Kleine et al. | 165/170 |

FOREIGN PATENT DOCUMENTS

| 1,097,233 | 7/1955 | France | 126/271 |
|---|---|---|---|
| 699,903 | 2/1931 | France | 165/170 |
| 407,476 | 2/1966 | Switzerland | 165/170 |
| 282,024 | 7/1952 | Switzerland | 126/271 |
| 822,768 | 10/1959 | United Kingdom | 126/271 |

Primary Examiner—Carroll B. Dority, Jr.

[57] ABSTRACT

The panel, as constructed of two plates or sheets marginally seam-welded together and subdivided internally into parallel longitudinal flow passages between vertically spaced inlet and outlet fittings, provides for a well distributed, low-volume flow of an appropriate heat transfer liquid therethrough, preferably from bottom to top thereof.

In one illustrated embodiment, such equalized flow distribution is insured by restricted central throat or diverter formations lying between the respective fittings, hence the opposed inlet and outlet ends of said longitudinal flow passages. Moreover, the center-most of said flow passages is longer than those at either side thereof, which progressively decrease in length to the side-most thereof, so that said header spaces incline mildly downwardly in reference to the vertical. This contributes to improved drainage of the panel when desired; it also tends to make for an even distribution as to the vertical flow.

In another embodiment, the inlet and outlet fittings are located adjacent diagonally opposite corners of the panel, with the opposite end header spaces sloping unidirectionally across the entire interior width of the plate unit. Diverter formations adjoin the fittings, as in the first form.

2 Claims, 6 Drawing Figures

U.S. Patent May 2, 1978 4,086,910
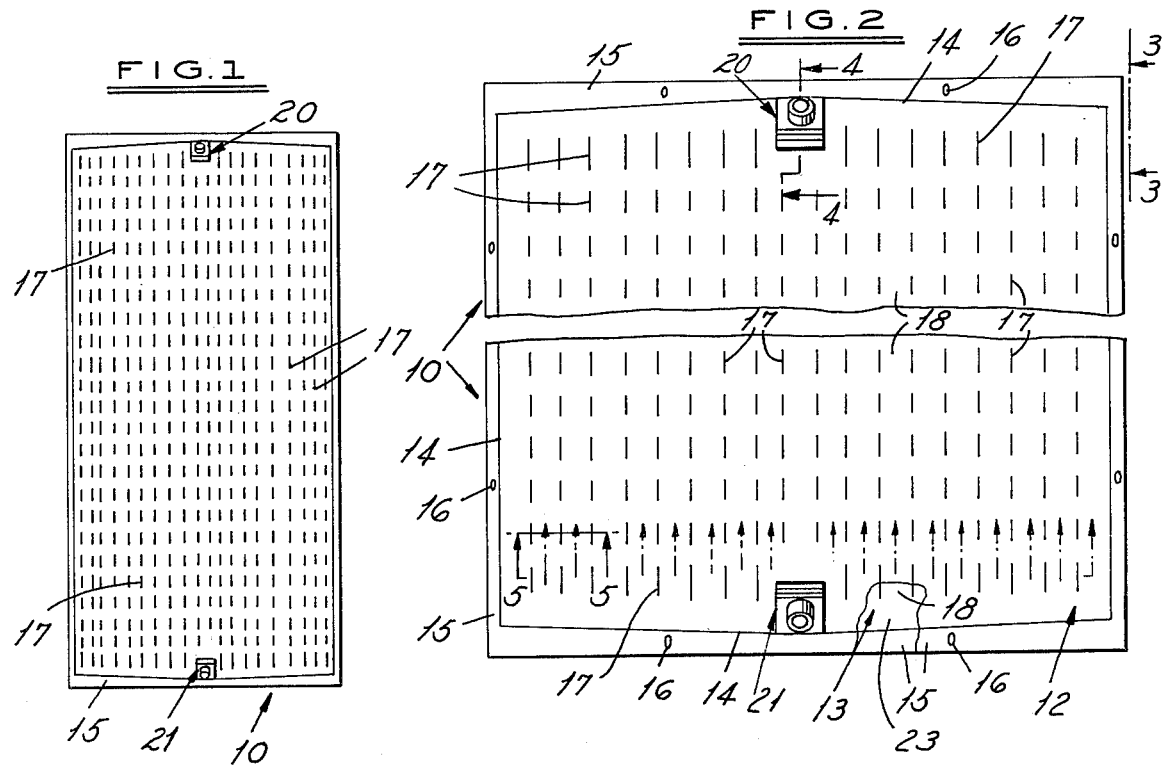
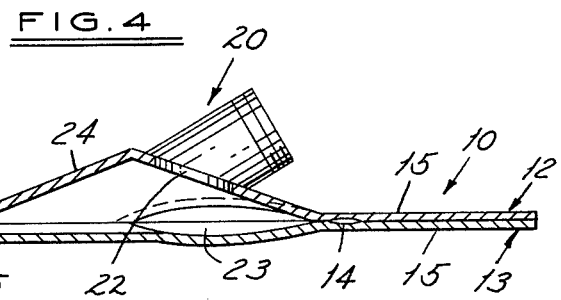
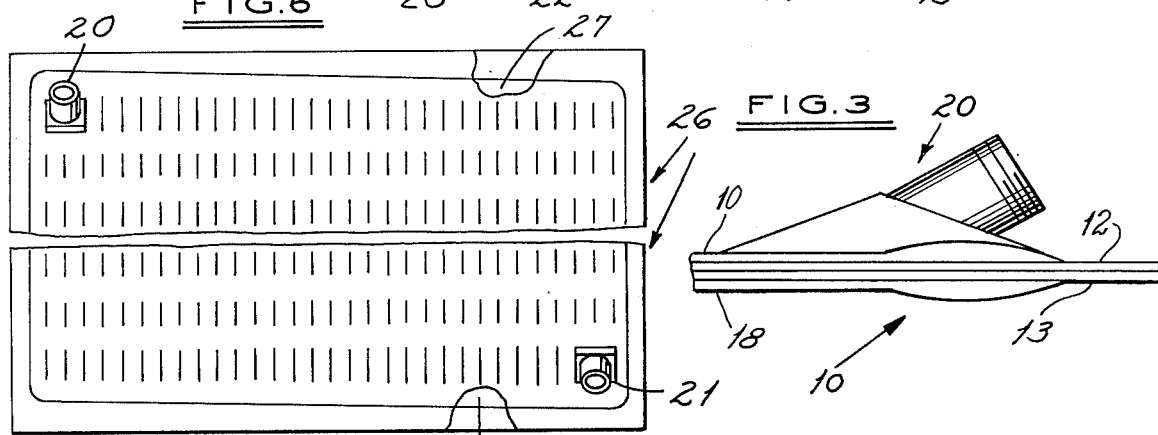
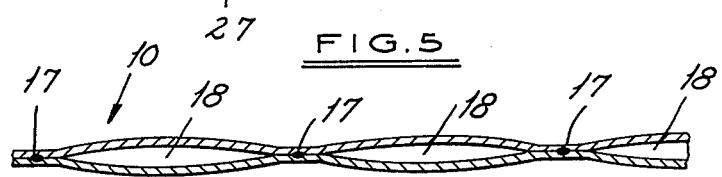

SOLAR ABSORBER PANEL

BACKGROUND OF THE INVENTION

The invention has application in dwellings and/or commercial structures, usually being installed beneath a roof opening of comparable area through which it is exposed. As connected to an appropriate simple manifold storage system, the operation of the absorber panel is automatically triggered, as by a photo-cell and thermally sensitive means, to cut in and out during daylight hours.

SUMMARY OF THE INVENTION

One of the problems with any conventional solar absorber is the fact that its inside water flow rates are extremely low, i.e., in the magnitude of ½ gallon per minute, which creates two problems:

(a) The unit normally has a relatively low heat pick-up rate because of low temperature differences and low air side coefficients; and (b) Because of the extremely low flow rates involved and the total size of the heat exchanger, it is absolutely essential that as perfect a distribution as possible be accomplished within the heat exchanger. Thus, if there is an inefficient heat exchanger to start with and some percentage is not functioning at all because of bad distribution, the adverse result in terms of the total performance becomes very significant.

The present invention specifically makes possible a close approach to the desired perfection, essentially because the sloped header areas of the panel and the presence of a flow diverter directly inboard insure the best possible flow distribution under differing operating conditions.

BRIEF DESCRIPTION OF THE DRAWINGS

FIG. 1 is a face elevational view of one embodiment of the panel of the invention, in which inlet and outlet fittings are central of opposite panel ends;

FIG. 2 is an enlarged scale view, partially broken, better illustrating the general structure and indicating the scheme of heat transfer liquid flow therein;

FIG. 3 is a fragmentary side edge elevation, as from the line 3—3 in FIG. 2;

FIG. 4 is a fragmental view in longitudinal section at 90° to the plane of the panel, i.e., on line 4—4 of FIG. 2;

FIG. 5 is a fragmentary transverse section on line 5—5 of FIG. 2; and

FIG. 6 is a view similar to FIG. 1 of another embodiment in which the inlet and outlet fittings are diagonally oppositely located.

DESCRIPTION OF A PREFERRED EMBODIMENT

The panel, as generally designated 10, comprises a pair of similarly proportioned rectangular carbon or stainless steel plates 12 and 13 which in a typical installation will measure about 82 inches in height by 34 inches in width, although these proportions are of course subject to variation. The typical proportioning enables a ½ gallon per minute through flow at an operating pressure of up to about 33 p.s.i.g. The plates are continuously seam-welded at 14 adjacent and about their marginal edges 15 for a leak-proof containment of the heat transfer fluid, typically ethylene glycol, which is circulated between manifolds of a closed external system (not shown). Appropriate openings 16 are spaced along the edge seam zone 15 to enable the solar absorber 10 to be mounted as desired; and in a representative domestic orientation this will be at the same angle as the house roof, just beneath a protective glass panel set in an opening therein, and just above a layer of an appropriate fiber glass or like insulative sheeting. Other installations will vary as to orientation but it is contemplated that in most instances the flow of the transfer fluid will be at a very slow rate and volume, for example, ½ gallon per minute and assisted convectively by the sun's rays. This contributes to a minimally complex storage and pumping system.

Inwardly of the marginal zones 15 the sheets 12, 14 are further weld-united to establish a desired internal flow pattern; this may be done by longitudinally and laterally spaced interrupted seam, stitch or spot weldments 17 as shown and as illustrated and described in Stowell U.S. Pat. No. 3,822,742 of July 9, 1974; or the welds may be longitudinally continuous. The significant thing is that the longitudinal flow streams, as indicated in dot-dash line in FIG. 2, are from bottom to top along individual paths or passages 18 defined by the longitudinal weldments 17, as shown in FIG. 5.

Intake and outlet fittings 20, 21, respectively, are individually necked down, fitted into and welded liquid-tight in openings 22 in the plate 12 of the absorber panel, and these fittings thus communicate with transverse intake and discharge header passages 23 of the unit 10. It should be borne in mind that the latter is symmetric about its upright center line (or section line 4—4); and in order to accommodate the fittings 20, 21 the plate 12 carries like central debossments 24 of limited width. These extend between the marginal seam-welded zone of the plate and merge in a straight line inwardly into the end-most transverse tier of longitudinal flow passages 18.

The fittings may be employed, in manufacturing unit 10, as hydraulic couplings for applying hydraulic pressure to expand the welded plates 12, 13 to form the pillow-like contour of the passages 18, headers 23 and other distributional lines, as in the case of Stowell U.S. Pat. No. 3,822,742, or the plates may be pre-stamped, particularly in reference to the debossments 24.

FIG. 4 shows that the debossment 24 terminates inwardly in a throat restriction at 25 which produces the approximate 50% division of the liquid flow which is indicated in FIG. 2, without objectionably throttling a central sub-flow from fitting to fitting. It should also be noted in reference to FIGS. 1 and 2 that the central bottom-to-top passage 18 is longer than the passages on either side thereof, which decrease uniformly in length toward the edges of the plate. Thus the opposite endmost lateral headers 23 are given a mild slope in opposite side directions which allows the unit to be readily drained and/or replenished with glycol as desired; angled fittings 20, 21 assist this.

FIG. 6 illustrates an alternative form of the panel, generally designated 26, which differs essentially from the embodiment 10 only in the fact that the inlet and outlet fittings 21, 20 are located adjacent diagonally opposite corners of panel 26, and that the end header spaces 27 slope from said fittings toward the respective opposite sides of the panel. Otherwise, the advantages in regard to drainage, flow distribution, etc., are the same.

All of the illustrated and above-described features contribute in the elimination of non-functional contours in a heat exchanger which, absent the features, is inefficient in view of its above-mentioned limitations of size, minimal flow volume, etc.

What is claimed is:

1. A solar heat absorber panel having a pair of superimposed sheets marginally sealed together, said sheets being secured together inwardly of said sealed margin thereof by longitudinally interrupted weld connections to provide a plurality of laterally spaced longitudinally extending internal flow passages extending substantially from end to end of said panel, laterally extending header spaces adjacent the ends of said panel in direct communication with said internal flow passages, inlet and outlet fluid flow fittings at opposite ends of said panel, each fitting having a chamber projecting above said panel across one of said header spaces centrally between opposite sides of said panel at the outer side of said chamber and tapered at the inner side thereof to form a restricted portion extending into one of said flow passages to laterally distribute fluid flow to the internal passages at both sides of said fittings, the header space at each end of said panel sloping from the central portion thereof laterally outwardly in a direction toward the opposite end of said panel so that said passages decrease uniformly in length from the central portion to the sides of said panel, thereby to improve drainage and to provide for a more even distribution of fluid flow through said passages.

2. A solar heat absorber panel as defined in claim 1, wherein said fittings are aligned with the central internal passage.

* * * * *